United States Patent
Noguchi et al.

(10) Patent No.: US 7,688,701 B2
(45) Date of Patent: Mar. 30, 2010

(54) OBJECTIVE OPTICAL SYSTEM AND OPTICAL PICKUP APPARATUS

(75) Inventors: Kazutaka Noguchi, Hachioji (JP); Yuichi Atarashi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 882 days.

(21) Appl. No.: 11/453,994

(22) Filed: Jun. 16, 2006

(65) Prior Publication Data

US 2006/0291363 A1 Dec. 28, 2006

(30) Foreign Application Priority Data

Jun. 20, 2005 (JP) .............................. 2005-179677

(51) Int. Cl.
*G11B 7/00* (2006.01)
(52) U.S. Cl. .............................. 369/112.08; 369/44.23
(58) Field of Classification Search ......... 359/644–646, 359/651, 661
See application file for complete search history.

(56) References Cited

U.S. PATENT DOCUMENTS

| 5,914,193 | A | * | 6/1999 | Ono et al. ................. 428/451 |
| 5,966,362 | A | * | 10/1999 | Arai et al. ............... 369/112.23 |
| 2004/0047040 | A1 | * | 3/2004 | Ota et al. ..................... 359/566 |
| 2005/0047315 | A1 | * | 3/2005 | Atarashi ................. 369/112.23 |
| 2005/0063281 | A1 | * | 3/2005 | Atarashi et al. ......... 369/112.03 |
| 2005/0068881 | A1 | * | 3/2005 | Kimura et al. .......... 369/112.23 |
| 2005/0122882 | A1 | * | 6/2005 | Kimura .................. 369/112.04 |

FOREIGN PATENT DOCUMENTS

| JP | A 2001-324673 | 11/2001 |
| JP | A 2004-144951 | 5/2004 |
| JP | A 2004-144953 | 5/2004 |
| JP | A 2004-144954 | 5/2004 |
| WO | WO 02/41307 | 5/2002 |

* cited by examiner

*Primary Examiner*—Jorge L Ortiz Criado
(74) *Attorney, Agent, or Firm*—Finnegan, Henderson, Farabow, Garrett & Dunner, L.L.P.

(57) ABSTRACT

An objective optical system according to the present invention is provided for use in an optical pickup apparatus for recording or reproducing information on an information recording surface of a first optical information recording medium using a first light flux emitted from a first light source. The objective optical system is provided with: a first lens with a positive refractive power including plastic; a second lens with a positive refractive power including plastic; and a first phase structure. A wavefront aberration change amount of the objective optical system when a wavelength of the first light flux changes, and a wavefront aberration change amount of the objective optical system when an ambient temperature of the objective optical system satisfy the predefined condition.

31 Claims, 4 Drawing Sheets

FIRST PHASE STRUCTURE

FIG. 2(b)    +

THIRD PHASE STRUCTURE

FIG. 2(c)    =

SUPERIMPOSED STRUCTURE

OBJECTIVE OPTICAL SYSTEM AND OPTICAL PICKUP APPARATUS

This application is based on Japanese Patent Application No. 2005-179677 filed on Jun. 20, 2005, in Japanese Patent Office, the entire content of which is hereby incorporated by reference.

FIELD OF THE INVENTION

The present invention relates to an objective optical system for use in an optical pickup apparatus and to the optical pickup apparatus, and in particular, to an objective optical system comprising a plurality of plastic lenses utilized in an optical pickup apparatus and the optical pickup apparatus employing the objective optical system.

BACKGROUND OF THE INVENTION

In recent years, research and development are advanced rapidly for a high density optical disc system that employs a violet semiconductor laser having a wavelength of about 400 nm, and is capable of conducting recording/reproducing of information. As an example, information of 23-27 GB per one layer can be recorded on an optical disc having a diameter of 12 cm that is the same size as in DVD (NA 0.0.6, light source wavelength 650 nm and memory capacity 4.7 GB) for an optical disc conducting recording/reproducing of information under specifications of NA 0.85 and light source wavelength 405 nm, namely, the so-called Blu-ray Disc (hereinafter referred to as BD), and, information of 15-20 GB per one layer can be recorded on an optical disc having a diameter of 12 cm for an optical disc conducting recording/reproducing of information under specifications of NA 0.65 and light source wavelength 405 nm, namely, the so-called HD DVD (hereinafter referred to as HD). In the mean time, a protective layer of BD is designed to be thinner than that of DVD (being 0.1 mm for BD, while 0.6 mm for DVD) to reduce an amount of comatic aberration caused by the skew, because comatic aberration caused by the skew of an optical disc is increased, in the case of BD. Hereafter, the optical disc of this kind is called "high density optical disc" in the present specification.

Meanwhile, a plastic lens has advantages that a mass production can be secured while keeping stable precisions at low cost, because injection molding at low temperature (approximately 120° C.) is possible, a long life of a metal mold can be secured and material cost is low. In Japanese patent application publication JP-A No. 2001-324673, therefore, there is suggested an objective optical system that includes a plastic single lens capable of realizing a numerical aperture of NA 0.85 and is used for an optical pickup apparatus.

However, the plastic single lens has a problem that spherical aberration caused by changes of refractive index resulting from temperature fluctuations grows greater, though it has the aforesaid advantages. The reason for this is that changes in spherical aberration caused by refractive index changes resulting from temperature changes grow greater in proportion to the fourth power of the numerical aperture ($NA^4$), and the spherical aberration tends to be more remarkable, in particular, when an optical surface having the greater curvature is formed for realizing a high numerical aperture. Meanwhile, in the following description, the characteristic of an optical element in the case of temperature changes will be sometimes called "temperature characteristic".

As a technology to correct temperature characteristic of a plastic single lens, International Publication Number WO 02/41307 Pamphlet discloses a technology to correct chromatic aberration and to correct temperature characteristic by providing a diffractive structure and a plurality of step structures extending in the optical axis direction (NPS: non-periodic phase structure) on an optical surface of the single lens. It is possible to improve temperature characteristic, by providing the step structure of this kind on an optical surface.

However, there is sometimes an occasion wherein so-called mode hopping in which the center wavelength skips for several nanometers in a moment in the laser light source used in an optical pickup apparatus, and an apparatus provided with a microscopic step structure such as NPS causes a problem that spherical aberration is increased in accordance with the wavelength slip, in the other words, wavelength characteristics deterioration. Further, a single lens having a high numerical aperture having a microscopic step structure such as NPS on its optical surface causes vignetting of a ray of light, resulting in a problem of a decline of light transmittance.

SUMMARY

The object of the present invention is to solve the aforementioned problems and to provide an objective optical system for optical pickup apparatus, and an optical pickup apparatus using the same characterized by low cost and excellent temperature characteristics.

The objective optical system for optical pickup apparatus according to the present invention is for use in an optical pickup apparatus for recording or reproducing information on an information recording surface of a first optical information recording medium with a protective layer with a thickness t1 using a first light flux with a wavelength λ1 emitted from a first light source. The objective optical system is provided with: a first lens with a positive refractive power comprising plastic; a second lens with a positive refractive power comprising plastic; and a first phase structure arranged on one of optical surfaces of the first lens and the second lens. A wavefront aberration change amount of the objective optical system generated when a wavelength of the first light flux changes, and the wavefront aberration change amount of the objective optical system generated when an ambient temperature of the objective optical system changes, satisfy the predefined condition.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 2A:
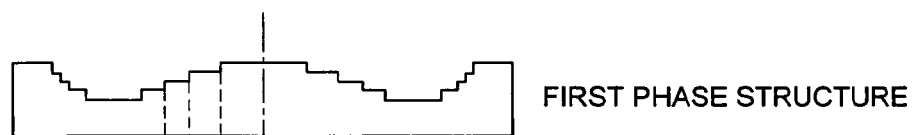
Figure 2A:
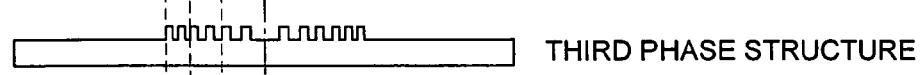
Figure 2A:
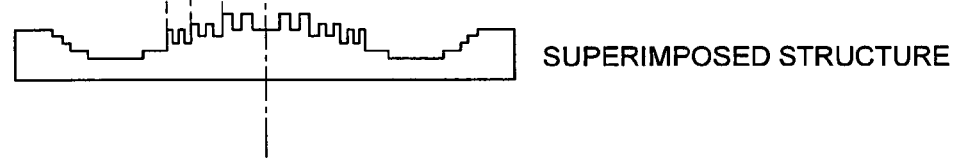
Figure 3:
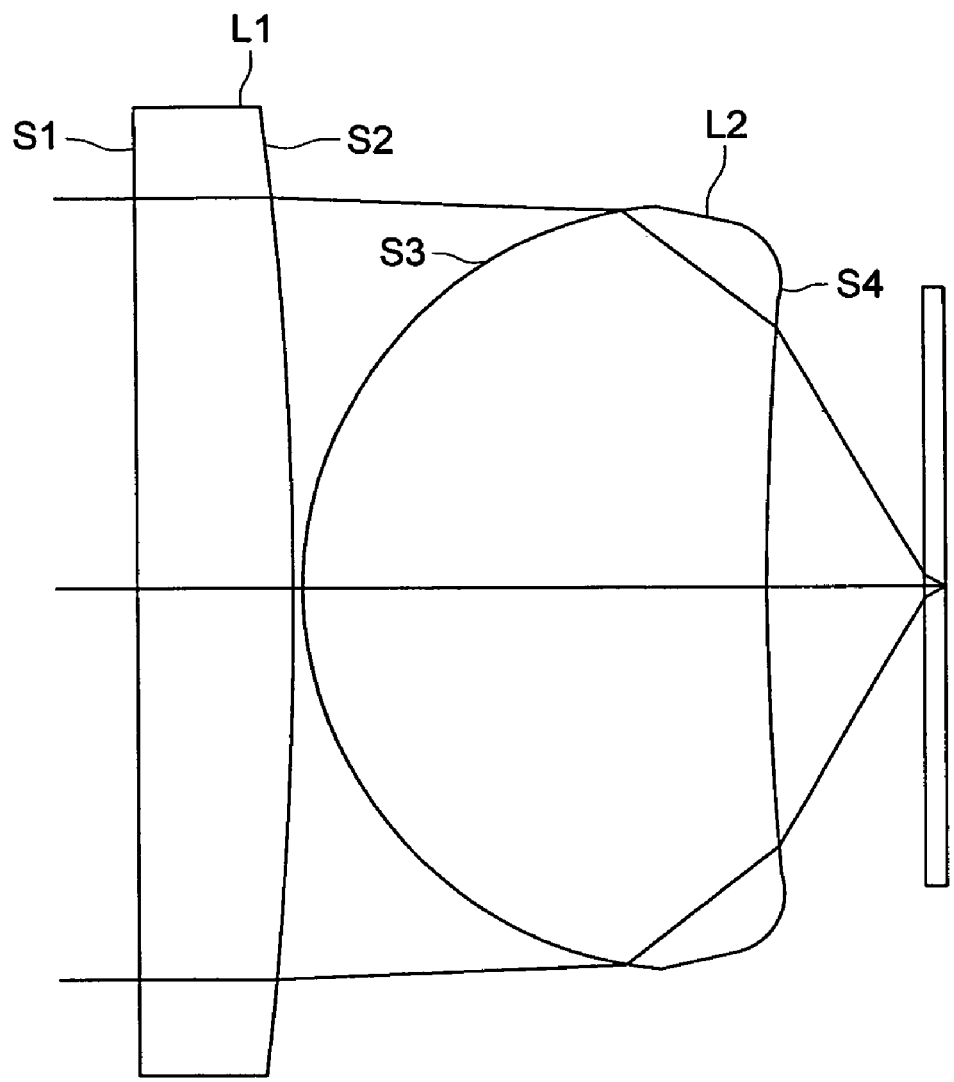
Figure 4:
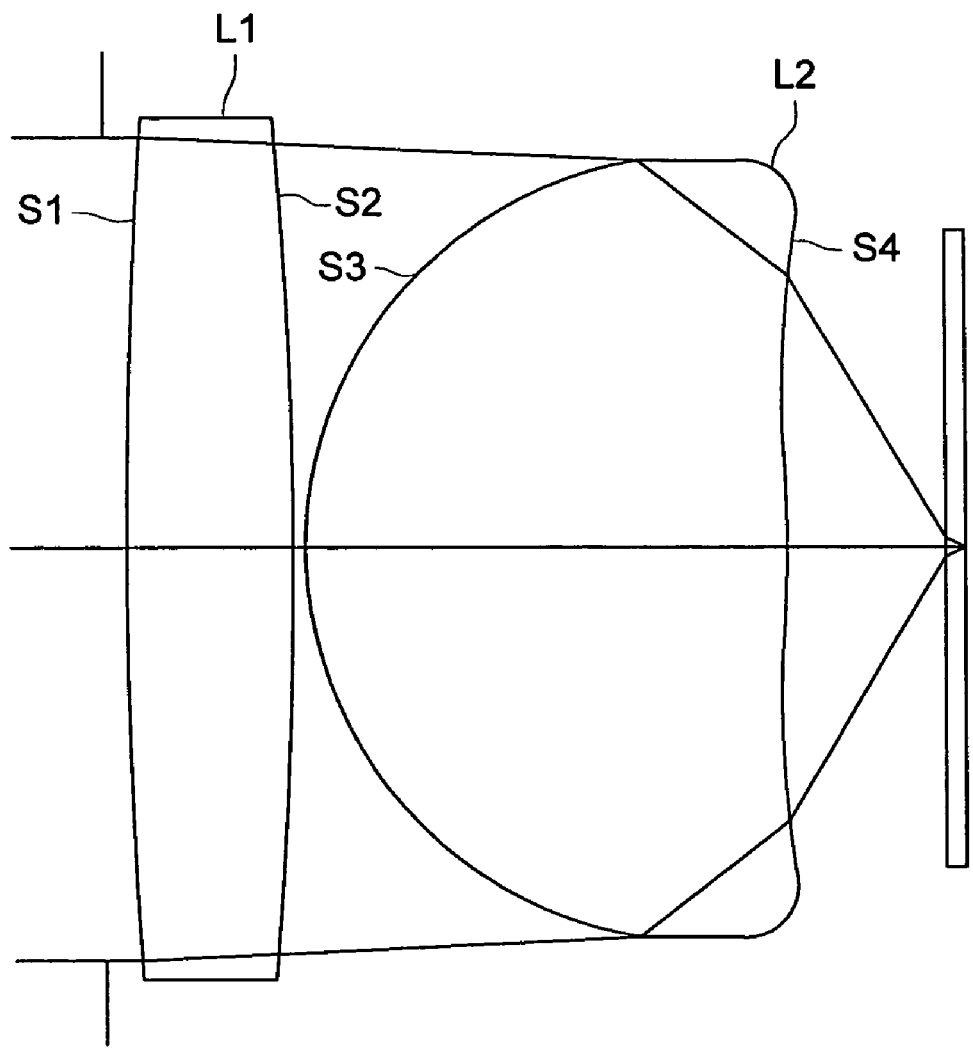

Each of FIGS. 2(a)-2(c) is a diagram showing superposition of phase structures;

FIG. 3 is a sectional view of an objective optical system of Example 1 wherein a lens barrel that fixes a first lens and a second lens is omitted; and FIG. 4 is a sectional view of an objective optical system of Example 2 wherein a lens barrel that fixes a first lens and a second lens is omitted.

DETAILED DESCRIPTION OF THE PREFERRED EMBODIMENTS

The following describes the preferred structure of the present invention.

Item 1 is an objective optical system for use in an optical pickup apparatus for recording or reproducing information on an information recording surface of a first optical information recording medium with a protective layer with a thickness t1 using a first light flux with a wavelength λ1 emitted from a first light source. The objective optical system includes: a first lens with a positive refractive power comprising plastic; a second lens with a positive refractive power comprising plastic and arranged in a closer position to the optical information recording media than the first lens; and a first phase structure arranged on one of optical surfaces of the first lens and the second lens. When a wavelength of the first light flux changes +5 nm from the wavelength λ1, a wavefront aberration change amount of the objective optical system on the information recording surface of the first optical information recording medium satisfies 0.010 λ1 rms or more, and 0.095 λ1 rms or less. When an ambient temperature of the objective optical system changes +30° C. from a design reference temperature, the wavefront aberration change amount of the objective optical system on the information recording surface of the first optical information recording medium satisfies 0.010 λ1 rms or more, and 0.095 λ1 rms or less.

The present objective optical system is provided with the aforementioned first and second plastic lenses, and each lens is provided with refractive power to reduce the curvature radius on the optical surface and to improve the temperature characteristic. However, satisfactory improvement of the temperature characteristic may not be achieved by mere dispersion of the refractive power in each lens. When the refractive power of the convex lens on the light source side in particular is increased, the working distance of the objective optical system will be reduced. This will yield restrictions at the time of installation on the optical pickup apparatus.

However, further improvement of the temperature characteristic can be achieved by using the phase structure such as an optical path difference providing structure represented by a diffractive structure, as will be described later. Improvement of the temperature characteristic, however, may involve deterioration of wavelength characteristic. It is important how to find out a way for compatibility between the temperature characteristic and wavelength characteristic. Thus, the balance is maintained between the temperature characteristic of the aforementioned objective optical system and the wavelength characteristic to ensure that, when the aforementioned first light flux is changed +5 nm from the aforementioned wavelength λ1, the change amount of the wavefront aberration on the information recording surface of the aforementioned first optical information recording medium is in the range from 0.010 λ1 rms or more without exceeding 0.095 λ1 rms, and, when the ambient temperature is changed +30° C. from the design reference temperature, the change amount of the wavefront aberration on the information recording surface of the aforementioned first optical information recording medium is in the range from 0.010 λ1 rms or more without exceeding 0.095 λ1 rms. This arrangement provides totally excellent optical characteristics to the objective optical system for optical pickup apparatus, while reducing the cost. The "ambient temperature" refers to the temperature of the atmosphere wherein the aforementioned objective optical system is installed.

Item 2 is the objective optical system of Item 1 in which when a wavelength of the first light flux changes +5 nm from the wavelength λ1, a wavefront aberration change amount of the objective optical system on the information recording surface of the first optical information recording medium satisfies 0.031 λ1 rms or more, and 0.095 λ1 rms or less, and when an ambient temperature of the objective optical system changes +30° C. from a design reference temperature, the wavefront aberration change amount of the objective optical system on the information recording surface of the first optical information recording medium satisfies 0.010 λ1 rms or more, and 0.050 λ1 rms or less.

According to the objective optical system, when the aforementioned first phase structure is provided, the temperature characteristic of the aforementioned objective optical system can be improved, but the wavelength characteristic may deteriorate. To solve this problem, the balance is more preferably maintained between the temperature characteristic of the aforementioned objective optical system and the wavelength characteristic to ensure that, when the aforementioned first light flux is changed +5 nm from the aforementioned wavelength λ1, the change amount of the wavefront aberration on the information recording surface of the aforementioned first optical information recording medium is in the range from 0.031 λ1 rms or more without exceeding 0.095 λ1 rms, and, when the ambient temperature is changed +30° C. from the design reference temperature, the change amount of the wavefront aberration on the information recording surface of the aforementioned first optical information recording medium is in the range from 0.010 λ1 rms or more without exceeding 0.050 λ1 rms. This arrangement provides totally excellent optical characteristics to the objective optical system for optical pickup apparatus, while reducing the cost.

In the present specification, "phase structure" means a general term of structures wherein a plurality of steps in the optical axis direction are provided and an optical path difference (phase difference) is added to the incident light flux. An optical path difference added to the incident light flux by the steps may be either a multiple of an integer of a wavelength of the incident light flux or a multiple of a non-integer of a wavelength of the incident light flux. Specific example of the phase structure of this kind is represented by a diffractive structure wherein the aforesaid steps are arranged in the direction perpendicular to the optical axis at periodical intervals, or by an optical path difference providing structure wherein the aforesaid steps are arranged in the direction perpendicular to the optical axis at non-periodic intervals (which is also called phase difference providing structure).

Item 3 is the objective optical system of Item 1 or 2 in which a wavefront aberration change amount generated by the first phase structure when a wavelength of the first light flux changes +1 nm from the wavelength λ1, is larger than a wavefront aberration change amount generated by the first phase structure when the ambient temperature of the objective optical system changes +10° C. from the design reference temperature, and is smaller than a wavefront aberration change amount generated by the first phase structure when the ambient temperature of the objective optical system changes +30° C. from the design reference temperature.

According to the objective optical system, when the aforementioned first phase structure is provided, the temperature characteristic of the aforementioned objective optical system can be improved, but the wavelength characteristic may deteriorate. To solve this problem, the balance is maintained between the temperature characteristic of the aforementioned first phase structure and the wavelength characteristic to ensure that the amount of change in the wavefront aberration produced when the aforementioned first light flux is changed +1 nm from the aforementioned wavelength λ1 is greater than the change amount of the wavefront aberration produced when the ambient temperature is changed +10° C. from the design reference temperature, and is smaller than the change amount of the wavefront aberration produced when the ambient temperature is changed +30° C. from the design reference temperature. This arrangement provides totally excellent optical characteristics to the objective optical system for optical pickup apparatus, while reducing the cost.

Item 4 is the objective optical system of any one of Items 1 to 3 in which a wavefront aberration change amount generated by the first phase structure on the information recording surface of the first optical information recording medium satisfies 0.033 λ1 rms or more, and 0.120 λ1 rms or less when a wavelength of the first light flux changes +5 nm from the wavelength λ1. A wavefront aberration change amount generated by the first phase structure satisfies 0.020 λ1 rms or more, and 0.060 λ1 rms or less when an ambient temperature of the objective optical system changes +30° C. from a design reference temperature.

According to this objective optical system, the balance is maintained between the temperature characteristic and the wavelength characteristic by providing a first phase structure to ensure that, when the aforementioned first light flux is changed +5 nm from the aforementioned wavelength λ1, the amount of change in the wavefront aberration on the information recording surface of the aforementioned first optical information recording medium is in the range from 0.033 λ1 rms or more without exceeding 0.120 λ1 rms, and, when the ambient temperature is changed +30° C. from the design reference temperature, the amount of change in the wavefront aberration on the information recording surface of the aforementioned first optical information recording medium is in the range from 0.020 λ1 rms or more without exceeding 0.060 λ1 rms. This arrangement provides totally excellent optical characteristics to the objective optical system for optical pickup apparatus, while reducing the cost.

In the present specification, a "first phase structure" is one provided with a central area including an optical axis and with plural ring-shaped zones divided by microscopic step differences on the outside of the central area and every adjoining ring-shaped zones are divided through a step difference with a predefined depth parallel to an optical axis. The structure has characteristics generating an optical path difference being a multiple of an integer of a wavelength of the incident light flux between wavefronts transmitted through adjoining ring-shaped zones at the prescribed temperature. The structure also has characteristics generating an optical path difference deviated from a multiple of an integer of a wavelength of the incident light flux between wavefronts transmitted through adjoining ring-shaped zones resulting of a refractive index change, in the case where the temperature is changed from the aforesaid prescribed temperature.

Item 5 is the objective optical system of any one of Items 1 to 4 in which the optical surface having the first phase structure is one of an optical surface facing the first light source of the first lens, an optical surface facing the first optical information recording medium of the first lens, and an optical surface facing the first light source of the second lens.

This is because vignetting of the light will be facilitated when the aforementioned first phase structure is provided on the side of the optical information recording medium of the aforementioned second lens. Further, when the aforementioned first phase structure is provided on the optical surface of the aforementioned first lens having a smaller curvature radius than the aforementioned second lens, greater advantages are ensured with respect to the processability of the mold for transfer and formation of the aforementioned first phase structure and transferability at the time of molding. In the meantime, the optical surface of the aforementioned second lens is provided with the aforementioned first phase structure. Thus, when an inter-lens decentration has occurred to the aforementioned first and second lenses, this arrangement reduces the comatic aberration caused by a change of temperature from the design reference temperature or by a change of wavelength from the reference wavelength.

Item 6 is the objective optical system of any one of Items 1 to 5 in which the objective optical system satisfies the following expression:

$$0.04 < P1/P < 0.24 \quad (1)$$

where P1 is a refractive power of the first lens, and P is a composite power of the first lens and the second lens.

Even in the case where the objective optical system is provided under temperature changes, or an oscillation wavelength of the light source is deviated from a reference wavelength, it is possible to restrain spherical aberration properly, and to properly recording and/or reproducing information in the optical pickup apparatus employing this objective optical system, by making a value of P1/P to be larger than the lower limit of the above expression (1). Further, when a ratio of refractive power of the first lens to power of the whole system of the objective optical system is made to be great, the working distance tends to be small, although an amount of wavefront aberration that changes under the temperature changes or the wavelength changes can be made small as described above. When that ratio is made to be smaller than the upper limit of the expression (1), a necessary working distance can be secured.

Item 7 is the objective optical system of any one of Items 1 to 6 in which the objective optical system is for use in the optical pickup apparatus further for recording or reproducing information on an information recording surface of a second optical information recording medium with a protective layer with a thickness t2(t1≦t2) by converging a second light flux with a wavelength λ2(λ1<λ2) emitted from a second light source on the information recording surface of the second optical information recording medium through the protective layer with the thickness t2.

Item 8 is the objective optical system of Item 7 in which the objective optical system satisfies the following expression:

$$0.04 < P1/P < 0.15 \quad (2)$$

where P1 is a refractive power of the first lens, and P is a composite power of the first lens and the second lens.

By making a value of P1/P to be greater than the lower limit of expression (2), it is possible to control spherical aberration to be excellent when the objective optical system is subjected to 30° C. of temperature change from the design reference temperature, and when an oscillation wavelength of the light source is deviated by +5 nm from a reference wavelength, whereby, it is possible to conduct properly recording and/or reproducing of information in the optical pickup apparatus employing this objective optical system. Further, when a ratio of refractive power of the first lens to power of the whole system of the objective optical system is made to be great, the working distance tends to be small, although an amount of wave front aberration that changes in the case of temperature changes or wavelength changes can be made small, which was described above. However, when that ratio is made to be smaller than the upper limit of the expression (2), a necessary working distance can be secured, even when the second light flux having the wavelength λ2 is considered.

In the present specification, "refractive power of the first lens" is expressed by a reciprocal number of a focal length of the first lens for the light converged by a refractive interface of the first lens. When a phase structure is formed on the refracting interface of the lens, a form of the base surface on which the phase structure is formed is made to be the refractive interface. Further, "power of the whole system of the objective optical system" is expressed by a reciprocal number of a focal length of the whole system of the objective optical system.

Item 9 is the objective optical system of Item 7 or 8, further including a second phase structure on an optical surface in the objective optical system. The second phase structure generates a 0th order diffracted light flux with a maximum light amount when the first light flux passes the second phase structure, and generates a first order diffracted light flux with a maximum light amount when the second light flux passes the second phase structure.

By providing the second phase structure, it is possible to provide a diffraction effect only when the second light flux having the aforesaid wavelength $\lambda 2$ passes, and to correct spherical aberration caused by a difference between thickness t1 of a protective layer of the first optical information recording medium and thickness t2 of a protective layer of the second optical information recording medium.

Item 10 is the objective optical system of Item 9 in which the second lens includes an optical surface having the first phase structure, and the first lens includes an optical surface having the second phase structure.

Generally, the aforementioned second phase structure is finer than the aforementioned first phase structure in many cases. The finer structure is preferably provided on the optical surface of the aforementioned first lens having a small curvature radius, because this improves the processability of the mold for transfer and formation of the aforementioned phase structure and transferability at the time of molding.

Item 11 is the objective optical system of Item 9 in which the first phase structure and the second phase structure is formed on one optical surface.

The aforementioned first phase structure and second phase structure are provided on one and the same optical surface. When they are superimposed on each other, the number of edges on the phase structure will be reduced in total. This will reduce the change of diffraction efficiency in each wavelength caused by an error at the time of manufacturing the phase structure.

Item 12 is the objective optical system of Item 9 in which the second lens comprises an optical surface having the second phase structure facing the first light source.

For example, when the aforementioned first lens is provided with the aforementioned second phase structure, the accuracy in the optical axis alignment of the aforementioned first and second lenses requires improvement. When the optical surface of the aforementioned second lens is provided with the aforementioned second phase structure, adjustment is facilitated due to a small sensitivity of inter-lens eccentricity. Thus, assembling without the need of alignment may be possible, depending on the case.

Item 13 is the objective optical system of any one of Items 7 to 12 in which the first phase structure is divided in a plurality of ring-shaped zones on the optical surface comprising the first phase structure. Every adjoining ring-shaped zones are divided through a step difference with a predefined depth parallel to an optical axis. When the wavelengths $\lambda 1$ and $\lambda 2$ satisfy the following expressions:

$$390 \text{ nm} < \lambda 1 < 420 \text{ nm} \tag{3}$$

$$640 \text{ nm} < \lambda 2 < 680 \text{ nm}, \tag{4}$$

the objective optical system satisfies the following expression.

$$1.7 \times \lambda 1/\{n(\lambda 1)-1\} \leq d \leq 2.3 \times \lambda 1/\{n(\lambda 1)-1\} \tag{5}$$

Where d is the predefined depth of the step difference, and $n(\lambda 1)$ is a refractive index of a material of the first phase structure for the wavelength $\lambda 1$.

When step differences of the aforesaid first phase structure are formed so that adjoining ring-shaped zones may provide an optical path difference equivalent to two times of the wavelength $\lambda 1$ of the light flux to a light flux passing through the ring-shaped zones under the reference state, it is possible to reduce fitting errors in the occasion wherein the wavefront aberration for a light flux having wavelength $\lambda 1$ caused when the temperature changes from the design reference temperature or when the wavelength changes from the reference wavelength is fitted to Fringe Zernike polynomial having up to 36 terms.

Item 14 is the objective optical system of any one of Items 7 to 12 in which the first phase structure is divided in a plurality of ring-shaped zones on the optical surface comprising the first phase structure, and every adjoining ring-shaped zones are divided through a step difference with a predefined depth parallel to an optical axis. When the wavelengths $\lambda 1$ and $\lambda 2$ satisfy the following expressions:

$$390 \text{ nm} < \lambda 1 < 420 \text{ nm} \tag{6}$$

$$640 \text{ nm} < \lambda 2 < 680 \text{ nm}, \tag{7}$$

the objective optical system satisfies the following expression.

$$4.7 \times \lambda 1/\{n(\lambda 1)-1\} \leq d \leq 5.3 \times \lambda 1/\{n(\lambda 1)-1\} \tag{8}$$

Where d is the predefined depth of the step difference, and $n(\lambda 1)$ is a refractive index of a material of the first phase structure for the wavelength $\lambda 1$.

When step differences of the aforesaid first phase structure are formed so that adjoining ring-shaped zones may provide an optical path difference equivalent to five times of the wavelength $\lambda 1$ of the light flux to a light flux passing through the ring-shaped zones under the reference state, it is possible to reduce fitting errors in the occasion wherein the wavefront aberration for a light flux having wavelength $\lambda 2$ caused when the temperature changes from the design reference temperature or when the wavelength changes from the reference wavelength is fitted to Fringe Zernike polynomial having up to 36 terms.

Item 15 is the objective optical system of Item 7 in which the objective optical system is for use in the optical pickup apparatus further for recording or reproducing information on an information recording surface of a third optical information recording medium with a protective layer with a thickness t3(t2<t3) by converging a third light flux with a wavelength $\lambda 3(\lambda 2 < \lambda 3)$ emitted from a third light source on the information recording surface of the third optical information recording medium through the protective layer with the thickness t3. Therefore, it allows recording and/or reproducing information on the high density optical disc, DVD and CD compatibly.

Item 16 is the objective optical system of Item 15 in which the objective optical system satisfies the following expression.

$$0.04 < P1/P < 0.11 \tag{9}$$

Where P1 is a refractive power of the first lens, and P is a composite power of the first lens and the second lens.

By making a value of P1/P to be greater than the lower limit of expression (9), it is possible to control spherical aberration to be excellent when the objective optical system is changed from the reference temperature by +30°, and when an oscillation wavelength of the light source is deviated from a reference wavelength by +5 nm, whereby, it is possible to conduct properly recording and/or reproducing of information in the optical pickup apparatus employing this objective optical system. Further, when a ratio of refractive power of the first lens to power of the whole system of the objective optical system is made to be great, the working distance tends to be small, although an amount of wavefront aberration that changes in the case of temperature changes or wavelength changes can be made small, which was described above. However, if that ratio is made to be smaller than the upper limit of the expression (9), a necessary working distance can be secured, even when the third light flux having the wavelength λ3 is considered.

Item 17 is the objective optical system of Item 15 or 16 further including: a second phase structure on an optical surface in the objective optical system; and a third phase structure on an optical surface in the objective optical system. The second phase structure generates a 0th order diffracted light flux with a maximum light amount when the first light flux passes the second phase structure, generates a first order diffracted light flux with a maximum light amount when the second light flux passes the second phase structure, and generates a 0th order diffracted light flux with a maximum light amount when the third light flux passes the second phase structure. The third phase structure generates a 0th order diffracted light flux with a maximum light amount when the first light flux passes the third phase structure, generates a 0th order diffracted light flux with a maximum light amount when the second light flux passes the third phase structure, and generates a first order diffracted light flux with a maximum light amount when the third light flux passes the third phase structure.

By providing the third phase structure in addition to the second phase structure, it is possible to provide a diffraction effect only when the third light flux having the aforesaid wavelength λ3 passes, and to correct spherical aberration caused by a difference between thickness t1 of a protective layer of the first optical information recording medium and thickness t3 of a protective layer of the third optical information recording medium.

Item 18 is the objective optical system of Item 17 in which the second lens comprises an optical surface having the first phase structure, and the first lens comprises an optical surface having the second phase structure and an optical surface having the third phase structure.

Generally, the aforementioned second and third phase structures are finer than the aforementioned first phase structure in many cases. The finer structure is preferably provided on the optical surface of the aforementioned first lens having a small curvature radius, because this improves the processability of the mold for transfer and formation of the aforementioned phase structure and transferability at the time of molding.

Item 19 is the objective optical system of Item 17 in which at least two of the first phase structure, the second phase structure, and the third phase structure are arranged on one optical surface.

By providing at least two of the first phase structure, the second phase structure, and the third phase structure on one optical surface, when they are superimposed on each other, the number of edges on the phase structure will be reduced in total. This will reduce the change of diffraction efficiency in each wavelength caused by an error at the time of manufacturing the phase structure.

Item 20 is the objective optical system of Item 17 in which the second lens comprises the second phase structure on an optical surface thereof facing the first light sources.

For example, when the aforementioned first lens is provided with the aforementioned second phase structure, the accuracy in the optical axis alignment of the aforementioned first and second lenses requires improvement. When the optical surface of the aforementioned second lens is provided with the aforementioned second phase structure, adjustment is facilitated due to a small sensitivity of inter-lens eccentricity. Thus, assembling without the need of alignment may be possible, depending on the case.

Item 21 is the objective optical system of any one of Items 15 to 20 in which the first phase structure is divided in a plurality of ring-shaped zones on the optical surface comprising the first phase structure, and every adjoining ring-shaped zones are divided through a step difference with a predefined depth parallel to an optical axis. When the wavelengths λ1, λ2 and λ3 satisfy the following expressions:

$$390 \text{ nm} < \lambda1 < 420 \text{ nm}, \tag{10}$$

$$640 \text{ nm} < \lambda2 < 680 \text{ nm, and} \tag{11}$$

$$760 \text{ nm} < \lambda3 < 805 \text{ nm}, \tag{12}$$

the objective optical system satisfies the following expressions.

$$1.7 \times \lambda1/\{n(\lambda1)-1\} \leq d \leq 2.3 \times \lambda1/\{n(\lambda1)-1\} \tag{13}$$

Where d is the predefined depth of the step difference, and n(λ1) is a refractive index of a material of the first phase structure for the wavelength λ1.

When step differences of the aforesaid first phase structure are formed so that adjacent ring-shaped zones may provide an optical path difference equivalent to two times of the wavelength λ1 of the light flux to a light flux passing through the ring-shaped zones under the reference state, it is possible to reduce fitting errors in the occasion wherein the wavefront aberration for a light flux having wavelength λ1 caused when the temperature changes from the design reference temperature or when the wavelength changes from the reference wavelength is fitted to Fringe Zernike polynomial having up to 36 terms.

Item 22 is the objective optical system of any one of Items 15 to 20 in which the first phase structure is divided in a plurality of ring-shaped zones on the optical surface comprising the first phase structure, and every adjoining ring-shaped zones are divided through a step difference with a predefined depth parallel to an optical axis. When the wavelengths λ1, λ2 and λ3 satisfy the following expressions:

$$390 \text{ nm} < \lambda1 < 420 \text{ nm}, \tag{14}$$

$$640 \text{ nm} < \lambda2 < 680 \text{ nm, and} \tag{15}$$

$$760 \text{ nm} < \lambda3 < 805 \text{ nm}, \tag{16}$$

the objective optical system satisfies the following expressions.

$$9.7 \times \lambda1/\{n(\lambda1)-1\} \leq d \leq 10.3 \times \lambda1/\{n(\lambda1)-1\} \tag{17}$$

Where d is the predefined depth of the step difference, and n(λ1) is a refractive index of a material of the first phase structure for the wavelength λ1.

When step differences of the aforesaid first phase structure are formed so that adjoining ring-shaped zones may provide an optical path difference equivalent to ten times of the wavelength λ1 of the light flux to a light flux passing through the ring-shaped zones under the reference state, it is possible to reduce fitting errors in the occasion wherein the wavefront aberration for a light flux having wavelength λ2 caused when the temperature changes from the design reference temperature or when the wavelength changes from the reference wavelength is fitted to Fringe Zernike polynomial having up to 36 terms.

Item 23 is the objective optical system of any one of Items 1 to 22 in which when the first light flux with the wavelength λ1 enters into the first lens provided individually with a magnification m1=0 and a transmitted light flux in the first lens is measured, the first lens causes a wavefront aberration of 0.070 λ1 rms or less, and when the first light flux with the wavelength λ1 enters into the second lens provided individually with a magnification m2=P1/P and a transmitted light flux in the second lens is measured, the first lens causes a wavefront aberration of 0.070 λ1 rms or less, where P1 is a refractive power of the first lens, and P is a composite power of the first lens and the second lens.

With respect to the first lens and the second lens, when restraining aberration for each of them individually, it is possible to provide the objective optical system having low spherical aberration, independently of an individual difference, even for any combination of both lenses.

Item 24 is the objective optical system of any one of Items 1 to 23 in which the first lens is a biconvex lens.

In general, it is preferable that the phase structure is provided on an optical surface having a small curvature, from a viewpoint of workability and moldability, and when a focal length of the first lens is fixed, the curvature can be made smallest by biconvex forms.

Item 25 is the objective optical system of any one of Items 1 to 24 in which the second lens includes a material such that a hindered amine light stabilizer and a heat stabilizer are added into a cyclic olefin copolymer represented by a general chemical formula (I), where $R^1$ is a one or more bivalent group selected from a hydrocarbon group with 2-20 carbon atoms, $R^2$ is a one or more monovalent group selected from a group consisting of a hydrogen and a hydrocarbon group with 1-5 carbon atoms, and each of x and y is copolymer ratio and a real number satisfying that x/y is equal to or more than 5/95 and is equal to or less than 95/5.

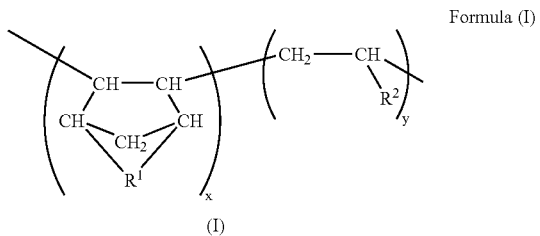

Formula (I)

(I)

Therefore, it allows providing an objective optical system for an optical pickup apparatus with an excellent light stability and heat stability.

$R^1$ in the general chemical formula (1) is preferably one or more bivalent group selected from a hydrocarbon group with 2-12 carbon atoms. $R^1$ is more preferably a bivalent group expressed by the following general chemical formula (II), where p in the general chemical formula (II) is an integer of 0 to 2. $R^1$ is still more preferably a bivalent group expressed by the general chemical formula (II), where p in the general chemical formula (II) is an integer of 0 or 1. Further, it is possible to use only one type of structure of $R^1$ or to use simultaneously two or more types of structures.

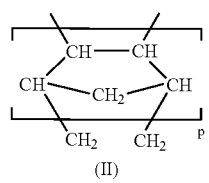

Formula (II)

(II)

Examples of a group represented by $R^2$ in the general chemical formula include: a hydrogen atom, a methyl group, an ethyl group, a n-propyl group, an i-propyl group, a n-butyl group, a 2-methylpropyl group, however, preferable is a hydrogen atom or a methyl group, and most preferable is a hydrogen atom.

Moreover, the type of copolymer is not restricted at all in the structure concerning the present invention and can apply well-known various copolymer types such as random copolymer, block copolymer, and alternating copolymer. However, the random copolymer is preferable.

(Hindered Amine Light Stabilizers)

Concrete example of the hindered amine light stabilizer (D) are condensation polymer of N,N',N",N"'-tetrakis-[4,6-bis-{butyl-(N-methyl-2,2,6,6-tetramethylpyperidine-4-yl) amino}-triazine-2-yl]-4,7-diazadecane-1,10-diamine, a polycondensate of dibutyl amine, 1,3,5-triazine and N,N'-bis (2,2,6,6-tetramethyl-4-pyperidyl)butylamine, poly[{(1,1,3, 3-tetramethylbutyl)amino-1,3,5-triazine-2,4-diyl}[(2,2,6,6-tetramethyl-4-pyperidyl)imino]-hexamethylene[(2,2,6,6-tetramethyl-4-pyperidyl)imino]], a polycondensate of 1,6-hexadiamine-N,N'-bis(2,2,6,6-tetramethyl-4-pyperidyl) and morphorine-2,4,6-trichloro-1,3,5-triazine, poly[(6-morphorino-s-tiazine-2,4-diyl)(2,2,6,6-tetramethyl-4-pyperidyl) imno]-hexamethylene[(2,2,6,6-tetramethyl-4-pyperidyl) imino]; and a high molecular weight hindered amine light stabilizer in which a pyperidine ring is bonded via a ester bond such as a polymer of dimethyl succinate and 4-hydroxy-2,2,6,6-tetramethyl-1-pyperidineethanol, a mixed esterified compound of 1,2,3,4-butane tetracarbonate, 1,2,2,6,6-pentamethyl-4-pyperidinol and 3,9-bis(2-hydroxy-1,1-dimethylethyl)-2,4,8,10-tetraoxaspiro[5,5]undecane.

Among these, preferable are poly[{6-(1,1,3,3-tetramethyl-butyl)amino-1,3,5-triazine-2,4-diyl}{(2,2,6,6-tetramethyl-4-pyperidyl)imino}-hexamethylene[(2,2,6,6-tetramethyl-4-pyperidyl)imino]].

The amount of the hindered amine light stabilizer (D) is preferably from 0.01 to 1.5, more preferably from 0.03 to 1.0, and particularly preferably from 0.05 to 0.5, by weight to 100 parts by weight of the polymer (A).

(Heat Stabilizer)

Furthermore, examples of heat stabilizers that may be added as an optional component include phenol-based antioxidants such as tetrakis[methylene-3-(3,5-di-t-butyl-4-hydoxyphenyl)propionate]methane, β-(3,5-di-t-butyl-4-hydoxyphenyl)propionate alkylester, and 2,2'-oxamidbis[ethyl-3-(3,5-di-t-butyl-4-hydoxyphenyl)propionate], fatty acid metal salts such as zinc stearate, calcium stearate and 1,2-hydroxy-calciumstearate and multivalent alcohol aliphatic ester such as glycerin monostearate, glycerin distearate, pentaerythritol monostearate, pentaerythritol distearate and pentaerythritol tristearate. In addition, phosphorus-based stabilizers such as distearylpentaerythritol diphosphite, phenyl-4,4'-isopropylidenediphenol-pentaerythritol diphosphite, bis(2,6-di-t-butyl-4-methylphenyl)pentaerythritol diphosphite, and tris(2,4-di-t-butylphenyl)phosphite may also be used for such heat stabilizers. These may be added singly or in combination with each other. As an example, the combination of tetrakis[methylene-3-(3,5-di-t-butyl-4-hydoxyphenyl) propionate]methane, zinc stearate and glycerin monostearate can be cited. These stabilizers may be used singly or in combination of not less than two of them.

Item 26 is the objective optical system of any one of Items 1 to 25 in which at least one of the first lens and the second lens comprises a material such that micropaticles whose diameter is equal to or less than 30 nm are dispersed in a resin provided as a base material. Since such a resin material has the characteristic that the refractive index change to a temperature change is small, compared with general resin for optics, it can reduce the load to a lens design and lens molding such that a phase structure is provided with a lens in order to improve temperature characteristics. Moreover, since the improving effect of the temperature characteristics by the above-mentioned first phase structure can be made moderate, it suppresses deterioration of wavelength characteristics. Otherwise, since power of the first lens can be made small when the improving effect of the temperature characteristics by the above-mentioned first phase structure is maintained as it is, working distance is securable for a long time.

Item 27 is the objective optical system of Item 26 in which the microparticles are inorganic particles.

Item 28 is the objective optical system of Item 26 in which the microparticles comprise inorganic oxide.

Item 29 is the objective optical system of any one of Items 26 to 28 in which the objective optical system satisfies the following expression.

$$|A| < 8 \times 10^{-5} \quad (18)$$

Where |A| is a refractive index change amount of the lens comprising the material such that micropaticles whose diameter is equal to or less than 30 nm are dispersed in a resin provided as a base material when a temperature of the lens raises by 1 C.°.

There is known an athermal resin as a material in which microparticles with a diameter of 30 nanometers or less are dispersed in a resin used as a base body. Since the athermal resin has a characteristic that the refractive index change to a temperature change is small, compared with a general resin for the optics, it can make moderate the improving effect of the temperature characteristics by the above-mentioned the first phase structure. Therefore, it can suppress aggravation of the wavelength characteristics.

Otherwise, since a power of the first lens can be made small when the improving effect of the temperature characteristics by the above-mentioned the first phase structure is maintained as it is, working distance is securable for a long time.

In general, when particles are mixed into the transparent resin material, light is scattered and the transmission factor is lowered. So, it is difficult to use as the optical material. However, it becomes clear that the microparticles whose size is smaller than the wavelength of the transmitting light flux prevent the scattering effectively. Herein, it is preferable that the resin material in which micro particles having average particle diameter of 30 nm or less and having a larger refractive index change than that of a resin provided as a base material are dispersed in the base material. When the refractive index change of the resin provided as the base material has negative sign, the mean of "larger refractive index change" includes refractive index change with negative sign having closer value to zero than the refractive index change of the base material and all of the refractive index change with positive sign.

It is known that the refractive index change of the resin material can be lowered by dispersing and mixing inorganic particles into the resin material while the refractive index of the resin material decreases when the temperature rises. Concretely, it is preferable that the refractive index change A which has been about $-1.2 \times 10^{-4}$ in the past is preferably controlled to be less than $8 \times 10^{-5}$, further preferably less than $6 \times 10^{-5}$, further more preferably $4 \times 10^{-5}$. There is provided the lens having no temperature dependency of the refractive index, or very low temperature dependency by using the material such that the inorganic particles whose size is 30 nanometer or less, preferably is 20 nanometer or less, more preferably 10-15 nanometer, are dispersed in the resin as base material for the material of the lens.

For example, acryl resin in which microparticles of niobium oxide ($Nb_2O_5$) are dispersed is provided. The volume ratio of the resin material that represents the basic material is about 80% and that of niobium oxide is about 20%, and these are mixed uniformly. Though microparticles have a problem that they tend to condense, the necessary state of dispersion can be kept by a technology to disperse particles by giving electric charges to the surface of each particle. Microparticles of silicon oxide ($SiO_2$) can also be used instead of niobium oxide.

It is preferable that microparticles are mixed and dispersed into the resin as a base material in line in the case of injection molding of optical elements. In other words, it is preferable that an objective optical unit is neither cooled nor solidified until it is molded, after its materials are mixed and dispersed, because the mixture is molded into an objective optical unit.

Incidentally, for controlling a rate of change of the refractive index for temperature, a volume ratio of acrylic resins to niobium oxide can be raised or lowered properly, and it is also possible to blend and disperse plural types of inorganic particles in a nanometer size.

Though the volume ratio of acrylic resins to niobium oxide is made to be 80:20, namely to be 4:1, in the example stated above, it is possible to adjust properly within a range from 90:10 (9:1) to 60:40 (3:2). It is not preferable when an amount of niobium oxide is less to be out of 9:1, because an effect of restraining temperature-affected changes becomes small. While, it is not also preferable when an amount of niobium oxide is more to be out of 3:2, because moldability of resins becomes problematic.

It is preferable that the microparticles are inorganic substances, and more preferable that the microparticles are oxides. Further, it is preferable that the state of oxidation is saturated, and the oxides are not oxidized any more.

It is preferable that the microparticles are inorganic substances because reaction between the inorganic substances and resin as a base material representing high molecular organic compound is restrained to be low, and deterioration caused by actual use such as irradiation of laser beam can be prevented because the microparticles are oxides. In particular, under the severe conditions such as high temperature and irradiation of a laser beam, oxidation of resin tends to be accelerated. However, microparticles of this inorganic oxide can prevent deterioration caused by oxidation.

Further, it is naturally possible to add antioxidants in resin material to prevent oxidation of resin caused by other factors.

Materials described in Japanese patent application publications JP-A 2004-144951, JP-A 2004-144953, JP-A 2004-144954 are suitable for a preferable material to be base material.

Item 30 is an optical pickup apparatus including: a first light source emitting a first light flux with a wavelength $\lambda 1$ for recording or reproducing information on an information recording surface of a first optical information recording medium with a protective layer with a thickness t1; the objective optical system of any one of Items 1 to 29.

Item 31 is the optical pickup apparatus of Item 30 further including: a second light source emitting a second light flux with a wavelength $\lambda 2 (\lambda 1 < \lambda 2)$ for recording or reproducing information on an information recording surface of a second optical information recording medium with a protective layer with a thickness $t2(t1 \leq t2)$.

Item 32 is the optical pickup apparatus of Item 31 further including: a third light source emitting a third light flux with a wavelength $\lambda 3 (\lambda 2 < \lambda 3)$ for recording or reproducing information on an information recording surface of a third optical information recording medium with a protective layer with a thickness $t3(t2<t3)$.

In the present specification, an objective optical system means an optical system including a lens that is arranged to be closest to the optical information recording medium side under the state where the optical information recording medium is mounted on the optical pickup apparatus to face the optical information recording medium, and it means a lens group capable of operating at least in the direction of its optical axis together with the aforesaid lens, by an actuator.

The invention makes it possible to provide an objective optical system that is low in cost, excellent in temperature characteristics and is utilized in an optical pickup apparatus and an optical pickup apparatus employing the objective optical system.

While the preferred embodiments of the present invention have been described using specific terms, such description is for illustrative purposes only, and it is to be understood that changes and variations may be made without departing from the sprit or scope of the appended claims.

Figure 1:
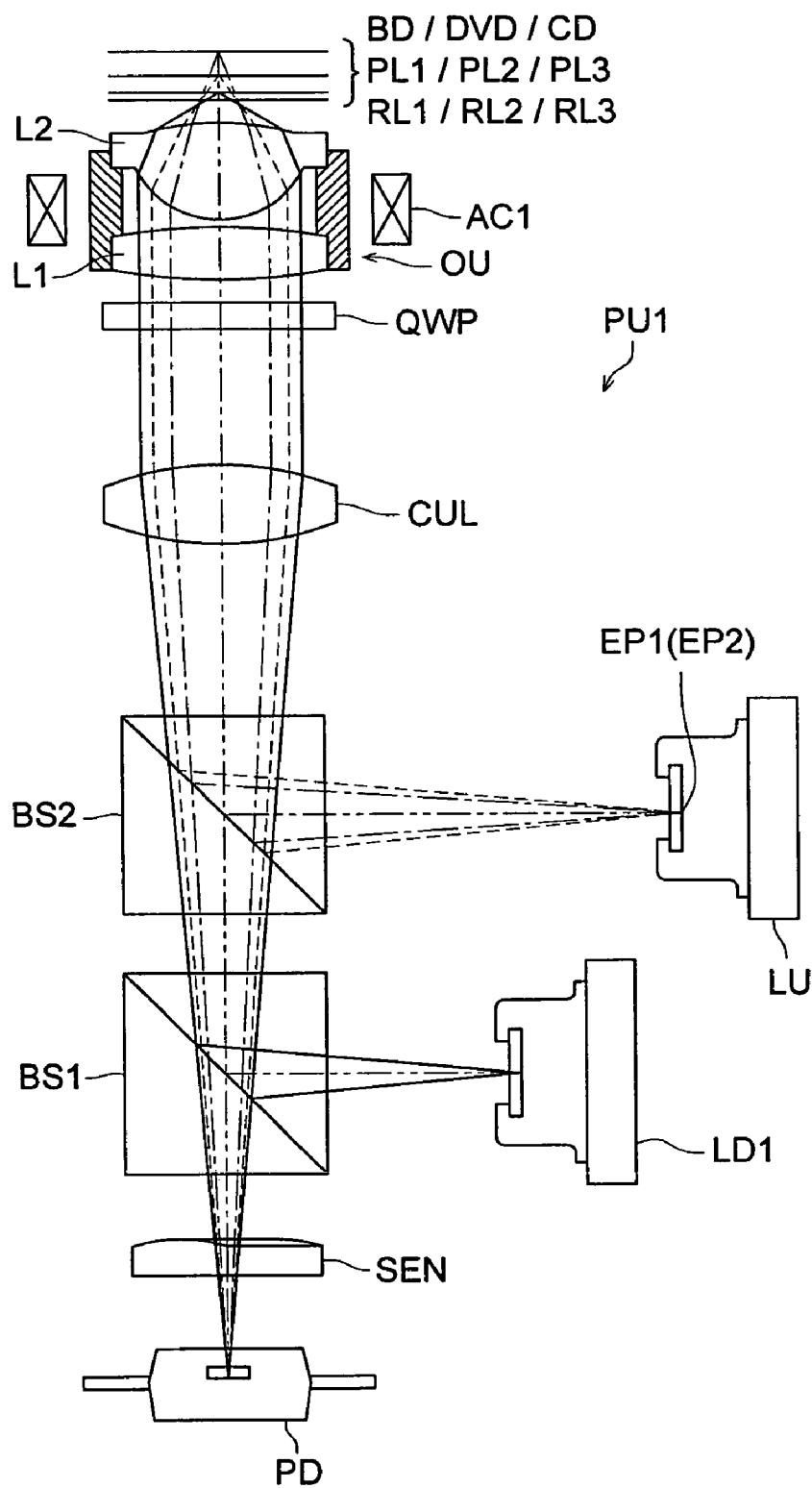
FIG. 1 is a diagram showing schematically the structure of an optical pickup apparatus in the present embodiment.

A specific embodiment of the invention will be explained as follows, referring to the drawings. FIG. 1 is a diagram showing schematically the structure of optical pickup apparatus PU1 of the present embodiment capable of conducting recording/reproducing of information for BD, DVD and CD each being a different optical information recording medium (which is also called an optical disc). The optical pickup apparatus PU1 of this kind can be mounted on an optical information recording and reproducing apparatus. Though the first optical information recording medium is BD, the second optical information recording medium is DVD and the third optical information recording medium is CD, in this case, the first optical information recording medium may also be HD.

The optical pickup apparatus PU1 is provided with violet semiconductor laser LD1 emitting a violet laser light flux (first light flux) having wavelength of 405 nm that is radiated when conducting recording/reproducing of information for BD, laser light source unit LU for DVD/CD wherein first emission point EP1 that emits a red laser light flux (second light flux) having wavelength of 658 nm radiated when conducting recording/reproducing of information for DVD and second emission point EP2 that emits an infrared laser light flux (third light flux) having wavelength of 783 nm radiated when conducting recording/reproducing of information for CD, are formed on the same chip, photodetector PD for common use for BD/DVD/CD, objective optical system OU that is provided with first lens L1 and second lens L2 both fixed solidly by a lens barrel, and has functions to converge a laser light flux on each of optical information recording surfaces RL1, RL2 and RL3, biaxial actuator AC1, coupling lens CUL, first polarized beam splitter BS1, second polarized beam splitter BS2, $\lambda/4$ wavelength plate QWP and sensor lens SEN for adding astigmatism to reflected light fluxes coming respectively from information recording surfaces RL1, RL2 and RL3. Incidentally, it is also possible to use a violet SHG laser as a light source for BD, in addition to the aforesaid violet semiconductor laser LD1.

When recording/reproducing information for BD in the optical pickup apparatus PU1, violet semiconductor laser LD1 is caused to emit light. A divergent light flux emitted from the violet semiconductor laser LD1 is reflected by the first polarized beam splitter BS1 as is shown with a light path drawn with solid lines in FIG. 1, then, is converted into a parallel light flux by coupling lens CUL after passing through the second polarized beam splitter BS2, and passes through $\lambda/4$ wavelength plate QWP and is regulated in terms of a diameter of the light flux by an unillustrated diaphragm STO, to become a spot formed by objective optical system OU on the information recording surface RL1 through protective layer PL1. The objective optical system OU conducts focusing and tracking by biaxial actuator AC1 arranged on its circumference.

After passing through the objective optical system OU and the $\lambda/4$ wavelength plate QWP again, the reflected light flux modulated by information pits on information recording surface RL1 becomes a convergent light flux when it passes through coupling lens CUL, and is given astigmatism by sensor lens SEN after passing through second polarized beam splitter BS2 and first polarized beam splitter BS1, to converge on a light-receiving surface of photodetector PD. Thus, information recorded on BD can be read by the use of output signals of the photodetector PD.

Further, when recording/reproducing information for DVD in the optical pickup apparatus PU1, first emission point EP1 is caused to emit light. A divergent light flux emitted from the first emission point EP1 is reflected by the second polarized beam splitter BS2 as is shown with a light path drawn with broken lines in FIG. 1, then, is converted into a parallel light flux by coupling lens CUL and passes through $\lambda/4$ wavelength plate QWP to become a spot formed by objective optical system OU on the information recording surface RL2 through protective layer PL2 of DVD. The objective optical system OU conducts focusing and tracking by biaxial actuator AC1 arranged on its circumference.

After passing through the objective optical system OU and the $\lambda/4$ wavelength plate QWP again, the reflected light flux modulated by information pits on information recording surface RL2 becomes a convergent light flux when it passes through coupling lens CUL, and is given astigmatism by sensor lens SEN after passing through second polarized beam splitter BS2 and first polarized beam splitter BS1, to converge on a light-receiving surface of photodetector PD. Thus, information recorded on DVD can be read by the use of output signals of the photodetector PD.

Further, when recording/reproducing information for CD in the optical pickup apparatus PU1, second emission point EP2 is caused to emit light. A divergent light flux emitted from the second emission point EP2 is reflected by the second polarized beam splitter BS2 as is shown with a light path drawn with one-dot chain lines in FIG. 1, then, is converted into a parallel light flux by coupling lens CUL and passes through λ/4 wavelength plate QWP to become a spot formed by objective optical system OU on the information recording surface RL3 through protective layer PL3 of CD. The objective optical system OU conducts focusing and tracking by biaxial actuator AC1 arranged on its circumference.

After passing through the objective optical system OU and the λ/4 wavelength plate QWP again, the reflected light flux modulated by information pits on information recording surface RL3 becomes a convergent light flux when it passes through coupling lens CUL, and is given astigmatism by sensor lens SEN after passing through second polarized beam splitter BS2 and first polarized beam splitter BS1, to converge on a light-receiving surface of photodetector PD. Thus, information recorded on CD can be read by the use of output signals of the photodetector PD.

The first lens L1 of the objective optical system OU provides opposite optical surfaces including an optical surface facing the light source in flat shape and a convex optical surface facing the optical disk (in the other words, the optical information recording medium) in convex aspheric shape, or both opposite optical surfaces being in convex aspheric shape. In the present embodiment, a first phase structure and a third phase structure are superimposed on the surface facing the light source of the first lens L1, and a second phase structure is provided on the surface facing a disc of the first lens L1. "Superimposition" in this case means forming structure shown in FIG. 2(c) having functions of the first phase structure and the third structure by adding microscopic-step-shaped first phase structure shown in FIG. 2(a) to microscopic ring-shaped third phase structure shown in FIG. 2(b), as a section of the first lens L1 is schematically shown in FIGS. 2(a)-2(c).

EXAMPLES

A preferred examples for the present embodiment will be explained as follows. Incidentally, hereafter (including lens data in Table), an exponent for 10 (for example, 2.5×10$^{-3}$) is expressed by E (for example, 2.5 E-3).

An optical surface of the objective optical system is formed to be an aspheric surface that is prescribed by a numerical expression wherein a coefficient shown in the table is substituted in Numeral 1, and is on an axis symmetry about an optical axis;

$$z=(h^2/R)/[1+\sqrt{1-(K+1)(h/R)^2}]+A_4h^4+A_6h^6+A_8h^8+A_{10}h^{10}+A_{12}h^{12}+A_{14}h^{14}+A_{16}h^{16}+A_{18}h^{18}+A_{20}h^{20}$$ (Numeral 1)

where z represents an aspheric surface form (a distance from a plane that is tangent to aspheric surface at its vertex in the direction parallel to the optical axis), h represents a distance from the optical axis, R represents a radius of curvature, K represents a conic constant, and $A_4$, $A_6$, $A_8$, $A_{10}$, $A_{12}$, $A_{14}$, $A_{16}$, $A_{18}$ and $A_{20}$ represent an aspheric surface coefficient.

Further, an optical path difference given to a light flux having each wavelength by the diffractive structure (phase structure) is prescribed by a numerical expression wherein a coefficient shown in the table is substituted in an optical path difference function of the expression of Numeral 2;

$$\phi=m\times\lambda/\lambda_B\times(B_2h^2+B_4h^4+B_6h^6+B_8h^8+B_{10}h^{10})$$ (Numeral 2)

where, $\phi$ represents an optical path difference function, $\lambda$ represents a wavelength of a light flux entering the diffractive structure, $\lambda_B$ represents a blazed wavelength, m represents a diffraction order number of a diffracted light flux used for recording/reproducing information on an optical disc, h represents a distance from an optical axis, and each of $B_2$, $B_4$, $B_6$, $B_8$ and $B_{10}$ represents an optical path difference function coefficient.

Example 1

Table 1 shows lens data of Example 1 (including a design wavelength, a focal length, a numerical aperture on the image side and a magnification). FIG. 3 is a cross sectional view of the objective optical system in Example 1. In this case, first lens L1 has optical surface S1 on the light source side and optical surface S2 on the optical disc side. Second lens L2 has optical surface S3 on the light source side and optical surface S4 on the optical disc side. In Example 1, the optical surface S1 on the light source side of the first lens is flat, and the optical surface S2 on the side of the optical disk is convex and aspherical. The optical surface S1 is provided with the first and third phase structures. The optical surface S2 is provided with the second phase structure. In the column of the first phase structure in the Table 1, i represents the number of ring-shaped zone, hi-1 represents a height in the direction perpendicular to the optical axis of a point where the ring-shaped zones start, from the optical axis and hi represents a height in the direction perpendicular to the optical axis of a point where ring-shaped zones terminate, from the optical axis, and a direction of the step differences provided between adjacent ring-shaped zones in the optical axis direction is positive when the steps face toward the protective layer from the light source. They are also applicable to Example 2.

In Table 1, each of f1 to f3 represents a focal length of the optical pickup apparatus for BD, DVD, and CD, each of d1 to d3 represent a surface distance on the optical axis for BD, DVD, and CD, each of Nλ1 to Nλ3 represents a refractive index for BD, DVD, and CD, each of m1 to m3 represents a magnification of the optical pickup apparatus for BD, DVD, and CD, νd represents an Abbe's constant.

As shown in Table 1, the second phase structure is designed so as to generate a 0th order diffracted light flux with a maximum light amount when the first light flux passes the second phase structure. The second phase structure is also designed so as to generate a first order diffracted light flux with a maximum light amount when the second light flux passes the second phase structure, and to generate a 0th order diffracted light flux with a maximum light amount when the third light flux passes the second phase structure. As shown in Table 1, the third phase structure is designed so as to generate a 0th order diffracted light flux with a maximum light amount when the first light flux passes the third phase structure. The third phase structure is also designed so as to generate a 0th order diffracted light flux with a maximum light amount when the second light flux passes the third phase structure, and to generate a first order diffracted light flux with a maximum light amount when the third light flux passes the third phase structure.

TABLE 1

Example 1
L1: plano-convex lens
Optical specifications
BD: NA1 = 0.85, f1 = 2.200 mm, λ1 = 405 nm, m1 = 0, t1 = 0.0875 mm
DVD: NA2 = 0.60, f2 = 2.140 mm, λ2 = 658 nm, m2 = 0, t2 = 0.6 mm
CD: NA3 = 0.45, f3 = 2.266 mm, λ3 = 783 nm, m3 = 0, t3 = 1.2 mm
Refractive index change amount of the first and second lenses
under temperature rise of 1° C.
dn/dt = −9.3e−5
Lens data

| Surface No. | R(mm) | d1(mm) | d2(mm) | d3(mm) | Nλ1 | Nλ2 | Nλ3 | vd | Remarks |
|---|---|---|---|---|---|---|---|---|---|
| 0 | — | ∞ | ∞ | ∞ | | | | | Light source |
| 1 | ∞ | 0.7000 | 0.7000 | 0.7000 | 1.55923 | 1.53972 | 1.53638 | 56.3 | First lens |
| 2 | −16.7894 | 0.0500 | 0.0500 | 0.0500 | | | | | |
| 3 | 1.3089 | 2.1000 | 2.1000 | 2.1000 | 1.55923 | 1.53972 | 1.53638 | 56.3 | Second lens |
| 4 | −5.2774 | 0.7042 | 0.5052 | 0.3591 | | | | | |
| 5 | ∞ | 0.0875 | 0.6000 | 1.2000 | 1.61958 | 1.57729 | 1.57095 | 30.0 | Protective layer |
| 6 | ∞ | | | | | | | | |

Refractive index of each optical element under wavelength shift of +5 nm

| | N(λ1 + 5 nm) | N(λ2 + 5 nm) | N(λ3 + 5 nm) |
|---|---|---|---|
| First lens | 1.558429 | 1.539551 | 1.536275 |
| Second lens | 1.558429 | 1.539551 | 1.536275 |
| Protective layer | 1.617604 | 1.576956 | 1.570761 |

Aspheric surface coefficient

| | Second surface | Third surface | Fourth surface |
|---|---|---|---|
| κ | −2.4325E+00 | −7.2692E−01 | −2.0222E+02 |
| A4 | 0.0000E+00 | 2.0190E−02 | 1.4925E−01 |
| A6 | 0.0000E+00 | 4.9864E−03 | −2.0292E−01 |
| A8 | 0.0000E+00 | 1.0277E−03 | 1.9975E−01 |
| A10 | 0.0000E+00 | 1.9856E−04 | −1.0729E−01 |
| A12 | 0.0000E+00 | 4.0459E−04 | 1.6814E−02 |
| A14 | 0.0000E+00 | −3.6509E−04 | 7.8023E−03 |
| A16 | 0.0000E+00 | 2.6454E−04 | −2.6358E−03 |
| A18 | 0.0000E+00 | −1.0021E−04 | 0.0000E+00 |
| A20 | 0.0000E+00 | 1.8719E−05 | 0.0000E+00 |

Optical path difference function

| | Third phase structure First surface | Second phase structure Second surface |
|---|---|---|
| Diffraction order number m (λ1/λ2/λ3) | 0/0/1 | 0/1/0 |
| Blaze wavelength(nm) | 783 | 658 |
| B2 | 3.2250E−02 | 1.0000E−02 |
| B4 | −4.2797E−03 | −3.0427E−03 |
| B6 | 5.2968E−03 | 1.3567E−03 |
| B8 | −2.7265E−03 | −2.0538E−04 |
| B10 | 5.1481E−04 | −1.0863E−04 |

First phase structure

| i | hi − 1(mm) | hi(mm) | Optical path difference | Step difference along optical axis (μm) |
|---|---|---|---|---|
| 1 | 0.000 | 0.220 | 0 | 0.000 |
| 2 | 0.220 | 0.429 | −2λ1 | 1.448 |
| 3 | 0.429 | 0.591 | −4λ1 | 2.897 |
| 4 | 0.591 | 0.695 | −6λ1 | 4.345 |
| 5 | 0.695 | 0.783 | −8λ1 | 5.794 |
| 6 | 0.783 | 0.887 | −10λ1 | 7.242 |
| 7 | 0.887 | 0.961 | −12λ1 | 8.691 |
| 8 | 0.961 | 1.020 | −14λ1 | 10.139 |
| 9 | 1.020 | 1.094 | −16λ1 | 11.587 |
| 10 | 1.094 | 1.153 | −18λ1 | 13.036 |
| 11 | 1.153 | 1.227 | −20λ1 | 14.484 |

TABLE 1-continued

Example 1
L1: plano-convex lens
Optical specifications
BD: NA1 = 0.85, f1 = 2.200 mm, λ1 = 405 nm, m1 = 0, t1 = 0.0875 mm
DVD: NA2 = 0.60, f2 = 2.140 mm, λ2 = 658 nm, m2 = 0, t2 = 0.6 mm
CD: NA3 = 0.45, f3 = 2.266 mm, λ3 = 783 nm, m3 = 0, t3 = 1.2 mm
Refractive index change amount of the first and second lenses
under temperature rise of 1° C.
dn/dt = −9.3e−5
Lens data

| | | | | |
|---|---|---|---|---|
| 12 | 1.227 | 1.271 | −22λ1 | 15.933 |
| 13 | 1.271 | 1.478 | −20λ1 | 14.484 |
| 14 | 1.478 | 1.523 | −18λ1 | 13.036 |
| 15 | 1.523 | 1.552 | −16λ1 | 11.587 |
| 16 | 1.552 | 1.582 | −14λ1 | 10.139 |
| 17 | 1.582 | 1.597 | −10λ1 | 7.242 |
| 18 | 1.597 | 1.611 | −8λ1 | 5.794 |
| 19 | 1.611 | 1.626 | −6λ1 | 4.345 |
| 20 | 1.626 | 1.700 | −4λ1 | 2.897 |

Example 2

Table 2 shows lens data of Example 2 (including a design wavelength, a focal length, a numerical aperture on the image side and a magnification). A section of the objective optical system of Example 2 is shown in FIG. 4. In Example 2, first lens L1 has optical surface S1 on the light source side and optical surface S2 on the optical disc side. Second lens L2 has optical surface S3 on the light source side and optical surface S4 on the optical disc side. In Example 2, each of both optical surfaces S1 and S2 of the first lens is a convex aspheric surface. The first phase structure and the third phase structure are provided on the optical surface S1, and the second phase structure is provided on the optical surface S2. Incidentally, in the Example 2, there is described only an optical path difference given by each ring-shaped zone, and step differences to give this optical path difference are assumed to be provided on optical surface S1 of the first lens on the light source side.

In Table 2, each of f1 to f3 represents a focal length of the optical pickup apparatus for BD, DVD, and CD, each of d1 to d3 represent a surface distance on the optical axis for BD, DVD, and CD, each of Nλ1 to Nλ3 represents a refractive index for BD, DVD, and CD, each of m1 to m3 represents a magnification of the optical pickup apparatus for BD, DVD, and CD, vd represents an Abbe's constant.

As shown in Table 2, the second phase structure is designed so as to generate a 0th order diffracted light flux with a maximum light amount when the first light flux passes the second phase structure. The second phase structure is also designed so as to generate a first order diffracted light flux with a maximum light amount when the second light flux passes the second phase structure, and to generate a 0th order diffracted light flux with a maximum light amount when the third light flux passes the second phase structure. As shown in Table 2, the third phase structure is designed so as to generate a 0th order diffracted light flux with a maximum light amount when the first light flux passes the third phase structure. The third phase structure is also designed so as to generate a 0th order diffracted light flux with a maximum light amount when the second light flux passes the third phase structure, and to generate a first order diffracted light flux with a maximum light amount when the third light flux passes the third phase structure.

TABLE 2

Example 2
L1: bi-convex lens
Optical specifications
BD: NA1 = 0.85, f1 = 2.200 mm, λ1 = 405 nm, m1 = 0, t1 = 0.0875 mm
DVD: NA2 = 0.60, f2 = 2.090 mm, λ2 = 658 nm, m2 = 0, t2 = 0.6 mm
CD: NA3 = 0.45, f3 = 2.272 mm, λ3 = 783 nm, m3 = 0, t3 = 1.2 mm
Refractive index change amount of the first and second lenses
under temperature rise of 1° C.
dn/dt = −9.3e−5
Lens data

| Surface No. | R(mm) | d1(mm) | d2(mm) | d3(mm) | Nλ1 | Nλ2 | Nλ3 | vd | Remarks |
|---|---|---|---|---|---|---|---|---|---|
| 0 | — | ∞ | ∞ | ∞ | | | | | Light source |
| 1 | 30.0000 | 0.7000 | 0.7000 | 0.7000 | 1.55923 | 1.53972 | 1.53638 | 56.3 | First lens |
| 2 | −37.6702 | 0.0500 | 0.0500 | 0.0500 | | | | | |
| 3 | 1.2986 | 2.1000 | 2.1000 | 2.1000 | 1.55923 | 1.53972 | 1.53638 | 56.3 | Second lens |
| 4 | −5.1425 | 0.6877 | 0.4361 | 0.3562 | | | | | |
| 5 | ∞ | 0.0875 | 0.6000 | 1.2000 | 1.61958 | 1.57729 | 1.57095 | 30.0 | Protective layer |
| 6 | ∞ | | | | | | | | |

TABLE 2-continued

Example 2
L1: bi-convex lens
Optical specifications
BD: NA1 = 0.85, f1 = 2.200 mm, λ1 = 405 nm, m1 = 0, t1 = 0.0875 mm
DVD: NA2 = 0.60, f2 = 2.090 mm, λ2 = 658 nm, m2 = 0, t2 = 0.6 mm
CD: NA3 = 0.45, f3 = 2.272 mm, λ3 = 783 nm, m3 = 0, t3 = 1.2 mm
Refractive index change amount of the first and second lenses
under temperature rise of 1° C.
dn/dt = −9.3e−5
Lens data

| | Refractive index of each optical element under wavelength shift of +5 nm | | |
|---|---|---|---|
| | N(λ1 + 5 nm) | N(λ2 + 5 nm) | N(λ3 + 5 nm) |
| First lens | 1.558429 | 1.539551 | 1.536275 |
| Second lens | 1.558429 | 1.539551 | 1.536275 |
| Protective layer | 1.617604 | 1.576956 | 1.570761 |

| | Aspheric surface coefficient | | |
|---|---|---|---|
| | Second surface | Third surface | Fourth surface |
| κ | −9.8230E+00 | −7.2517E−01 | −1.7668E+02 |
| A4 | 0.0000E+00 | 2.0262E−02 | 1.5369E−01 |
| A6 | 0.0000E+00 | 4.8122E−03 | −2.0289E−01 |
| A8 | 0.0000E+00 | 1.5108E−03 | 1.9765E−01 |
| A10 | 0.0000E+00 | −1.1767E−05 | −1.0813E−01 |
| A12 | 0.0000E+00 | 4.4436E−04 | 1.7660E−02 |
| A14 | 0.0000E+00 | −3.4260E−04 | 8.2029E−03 |
| A16 | 0.0000E+00 | 2.6122E−04 | −2.8860E−03 |
| A18 | 0.0000E+00 | −1.0271E−04 | 0.0000E+00 |
| A20 | 0.0000E+00 | 1.9690E−05 | 0.0000E+00 |

| | Optical path difference function | |
|---|---|---|
| | Third phase structure First surface | Second phase structure Second surface |
| Diffraction order number m (λ1/λ2/λ3) | 0/0/1 | 0/1/0 |
| Blaze wavelength(nm) | 783 | 658 |
| B2 | 3.3300E−02 | 3.3850E−03 |
| B4 | −2.1682E−03 | −1.4869E−03 |
| B6 | 1.8691E−03 | −4.4255E−04 |
| B8 | −3.5391E−04 | 4.2542E−04 |
| B10 | 3.7376E−05 | −2.0371E−04 |

| | First phase structure | | |
|---|---|---|---|
| i | hi − 1(mm) | hi(mm) | Optical path difference |
| 1 | 0.000 | 0.220 | 0 |
| 2 | 0.220 | 0.429 | −2λ1 |
| 3 | 0.429 | 0.591 | −4λ1 |
| 4 | 0.591 | 0.695 | −6λ1 |
| 5 | 0.695 | 0.783 | −8λ1 |
| 6 | 0.783 | 0.887 | −10λ1 |
| 7 | 0.887 | 0.961 | −12λ1 |
| 8 | 0.961 | 1.020 | −14λ1 |
| 9 | 1.020 | 1.094 | −16λ1 |
| 10 | 1.094 | 1.153 | −18λ1 |
| 11 | 1.153 | 1.227 | −20λ1 |
| 12 | 1.227 | 1.271 | −22λ1 |
| 13 | 1.271 | 1.478 | −20λ1 |
| 14 | 1.478 | 1.523 | −18λ1 |
| 15 | 1.523 | 1.552 | −16λ1 |
| 16 | 1.552 | 1.582 | −14λ1 |
| 17 | 1.582 | 1.597 | −10λ1 |
| 18 | 1.597 | 1.611 | −8λ1 |
| 19 | 1.611 | 1.626 | −6λ1 |
| 20 | 1.626 | 1.700 | −4λ1 |

Table 3 summarizes the values specified in items 1 through 4 for Examples 1 and 2. The design reference temperature is assumed as 35° C. in this case.

TABLE 3

| | Change amount of wavefront aberration | | | | | |
|---|---|---|---|---|---|---|
| | Objective optical system as a whole | | First phase structure | | | |
| | Design reference temperature +30° C. | Reference wavelength +5 nm | Design reference temperature +10° C. | Design reference temperature +30° C. | Reference wavelength +1 nm | Reference wavelength +5 nm |
| Example 1 | 0.022 | 0.074 | 0.010 | 0.035 | 0.018 | 0.100 |
| Example 2 | 0.022 | 0.074 | 0.010 | 0.035 | 0.018 | 0.100 |

[λ rms]
P1/P is 0.07 for both Examples 1 and 2.

The embodiment and example stated above do not limit the scope of the present invention.

The first phase structure may also be provided on either one of an optical surface of the first lens on the light source side, an optical surface of the first lens on the optical information recording medium side, and an optical surface of the second lens on the light source side. Further, there may be provided the objective optical system including the second lens provided with an optical surface including the first phase structure and the first lens provided with an optical surface including the second phase structure and an optical surface including the third phase structure. There also may be provided the objective optical system including the second lens provided with an optical surface facing the first light source including the second phase structure.

The objective optical system of the invention may also be applied to an optical pickup apparatus capable of conducting recording and/or reproducing of information only for high density optical disc or an optical pickup apparatus capable of conducting recording and/or reproducing of information compatibly for high density optical disc and DVD or CD.

Further, it is also possible to apply an objective optical system without the third phase structure and with step differences of the first phase structure formed so as to provide an optical path difference equivalent to two wavelengths or five wavelengths per wavelength λ1 in the reference state to light fluxes adjoining ring-shaped zones, to a optical pickup apparatus PU1 of the present embodiment capable of recording/reproducing information properly for high density disc and DVD.

Though the steps of the first phase structure are formed so that an optical path difference equivalent to two wavelengths per wavelength λ1 in the reference state may be given between adjoining ring-shaped zones, in the present examples, it is naturally possible to use a phase structure having the steps that gives an optical path difference equivalent to ten wavelengths per wavelength λ1 in the reference state.

In the optical pickup apparatus of the present examples, it is preferable that the first lens L1 causes a wavefront aberration of 0.070 λ1 rms or less when the first light flux with the wavelength λ1 enters into the first lens L1 provided individually with a magnification m1=0 and a transmitted light flux by the first lens L1 is measured. It is also preferable that the second lens L2 causes a wavefront aberration of 0.070 λ1 rms or less when the first light flux with the wavelength λ1 enters into the second lens L2 provided individually with a magnification m2=P1/P and a transmitted light flux by the second lens L2 is measured. Where, P1 is a refractive power of the first lens, and P is a composite power of the first lens L1 and the second lens L2.

In the optical pickup apparatus of the present example, it is preferable that the second lens L2 is formed of a material such that a hindered amine light stabilizer and a hindered amine heat stabilizer are added into a cyclic olefin system copolymer which represented by the above described general chemical formula (I). It is also preferable that at least one of the first lens L1 and the second lens L2 is formed of a material such that microparticles whose diameter is equal to or less than 30 nm are dispersed in a resin provided as a base material.

What is claimed is:

1. An objective optical system for use in an optical pickup apparatus for recording or reproducing information on an information recording surface of a first optical information recording medium with a protective layer with a thickness t1 using a first light flux with a wavelength λ1 emitted from a first light source, the objective optical system comprising:
  a first lens with a positive refractive power comprising plastic;
  a second lens with a positive refractive power comprising plastic and arranged in a closer position to the first optical information recording medium than the first lens; and
  a first phase structure arranged on one of optical surfaces of the first lens and the second lens,
  wherein when a wavelength of the first light flux changes +5 nm from the wavelength λ1, a wavefront aberration change amount of the objective optical system on the information recording surface of the first optical information recording medium satisfies 0.031 λ1 rms or more, and 0.095 λ1 rms or less, and
  when an ambient temperature of the objective optical system changes +30° C. from a design reference temperature, the wavefront aberration change amount of the objective optical system on the information recording surface of the first optical information recording medium satisfies 0.010 λ1 rms or more, and 0.050 λ1 rms or less.

2. The objective optical system of claim 1,
  wherein a wavefront aberration change amount generated by the first phase structure when a wavelength of the first light flux changes +1 nm from the wavelength λ1, is larger than a wavefront aberration change amount generated by the first phase structure when the ambient temperature of the objective optical system changes +10° C. from the design reference temperature, and is smaller than a wavefront aberration change amount generated by the first phase structure when the ambient temperature of the objective optical system changes +30° C. from the design reference temperature.

3. The objective optical system of claim 1,
wherein a wavefront aberration change amount generated by the first phase structure on the information recording surface of the first optical information recording medium satisfies 0.033 λ1 rms or more, and 0.120 λ1 rms or less when a wavelength of the first light flux changes +5 nm from the wavelength λ1, and the wavefront aberration change amount generated by the first phase structure satisfies 0.020 λ1 rms or more, and 0.060 λ1 rms or less when an ambient temperature of the objective optical system changes +30° C. from a design reference temperature.

4. The objective optical system of claim 1,
wherein the optical surface having the first phase structure is one of an optical surface facing the first light source of the first lens, an optical surface facing the first optical information recording medium of the first lens, and an optical surface facing the first light source of the second lens.

5. The objective optical system of claim 1,
wherein the objective optical system satisfies $$0.04 < P1/P < 0.24$$

where P1 is a refractive power of the first lens, and P is a composite power of the first lens and the second lens.

6. The objective optical system of claim 1,
wherein the objective optical system is for use in the optical pickup apparatus further for recording or reproducing information on an information recording surface of a second optical information recording medium with a protective layer with a thickness t2 (t1≦t2) by converging a second light flux with a wavelength λ2(λ1<λ2) emitted from a second light source on the information recording surface of the second optical information recording medium through the protective layer with the thickness t2.

7. The objective optical system of claim 6,
wherein the objective optical system satisfies $$0.04 < P1/P < 0.15$$

where P1 is a refractive power of the first lens, and P is a composite power of the first lens and the second lens.

8. The objective optical system of claim 6, further comprising a second phase structure on an optical surface in the objective optical system, wherein the second phase structure generates a 0th order diffracted light flux with a maximum light amount when the first light flux passes the second phase structure, and generates a first order diffracted light flux with a maximum light amount when the second light flux passes the second phase structure.

9. The objective optical system of claim 8,
wherein the second lens comprises an optical surface including the first phase structure, and
the first lens comprises an optical surface including the second phase structure.

10. The objective optical system of claim 8,
wherein the first phase structure and the second phase structure is formed on one optical surface.

11. The objective optical system of claim 8,
wherein the second lens comprises an optical surface including the second phase structure facing the first light source.

12. The objective optical system of claim 6,
wherein the first phase structure is divided in a plurality of ring-shaped zones on the optical surface comprising the first phase structure, every adjoining ring-shaped zones are divided through a step difference with a predefined depth parallel to an optical axis, and when the wavelengths λ1 and λ2 satisfy the following expressions:

$$390 \text{ nm} < \lambda 1 < 420 \text{ nm and}$$

$$640 \text{ nm} < \lambda 2 < 680 \text{ nm},$$

the objective optical system satisfies $$1.7 \times \lambda 1 / \{n(\lambda 1) - 1\} \leq d \leq 2.3 \times \lambda 1 / \{n(\lambda 1) - 1\},$$

where d is the predefined depth of the step difference, and n(λ1) is a refractive index of a material of the first phase structure for the wavelength λ1.

13. The objective optical system of claim 6,
wherein the first phase structure is divided in a plurality of ring-shaped zones on the optical surface comprising the first phase structure, every adjoining ring-shaped zones are divided through a step difference with a predefined depth parallel to an optical axis, and when the wavelengths λ1 and λ2 satisfy the following expressions:

$$390 \text{ nm} < \lambda 1 < 420 \text{ nm and}$$

$$640 \text{ nm} < \lambda 2 < 680 \text{ nm},$$

the objective optical system satisfies $$4.7 \times \lambda 1 / \{n(\lambda 1) - 1\} \leq d \leq 5.3 \times \lambda 1 / \{n(\lambda 1) - 1\},$$

where d is the predefined depth of the step difference, and n(λ1) is a refractive index of a material of the first phase structure for the wavelength λ1.

14. The objective optical system of claim 6,
wherein the objective optical system is for use in the optical pickup apparatus further for recording or reproducing information on an information recording surface of a third optical information recording medium with a protective layer with a thickness t3 (t2<t3) by converging a third light flux with a wavelength λ3 (λ2<λ3) emitted from a third light source on the information recording surface of the third optical information recording medium through the protective layer with the thickness t3.

15. The objective optical system of claim 14,
wherein the objective optical system satisfies $$0.04 < P1/P < 0.11$$

where P1 is a refractive power of the first lens, and P is a composite power of the first lens and the second lens.

16. The objective optical system of claim 14, further comprising:

a second phase structure on an optical surface in the objective optical system; and a third phase structure on an optical surface in the objective optical system, wherein the second phase structure generates a 0th order diffracted light flux with a maximum light amount when the first light flux passes the second phase structure, generates a first order diffracted light flux with a maximum light amount when the second light flux passes the second phase structure, and generates a 0th order diffracted light flux with a maximum light amount when the third light flux passes the second phase structure, and the third phase structure generates a 0th order diffracted light flux with a maximum light amount when the first light flux passes the third phase structure, generates a 0th order diffracted light flux with a maximum light amount when the second light flux passes the third phase structure, and generates a first order diffracted light flux with a maximum light amount when the third light flux passes the third phase structure.

17. The objective optical system of claim 16, wherein the second lens comprises an optical surface including the first phase structure, and the first lens comprises an optical surface including the second phase structure and an optical surface including the third phase structure.

18. The objective optical system of claim 16, wherein at least two of the first phase structure, the second phase structure, and the third phase structure are arranged on one optical surface.

19. The objective optical system of claim 16, wherein the second lens comprises the second phase structure on an optical surface thereof facing the first light sources.

20. The objective optical system of claim 14, wherein the first phase structure is divided in a plurality of ring-shaped zones on the optical surface comprising the first phase structure, every adjoining ring-shaped zones are divided through a step difference with a predefined depth parallel to an optical axis, and when the wavelengths $\lambda 1$, $\lambda 2$ and $\lambda 3$ satisfy the following expressions:

390 nm<$\lambda 1$<420 nm, 640 nm<$\lambda 2$<680 nm, and 760 nm<$\lambda 3$<805 nm, the objective optical system satisfies $1.7 \times \lambda 1/\{n(\lambda 1)-1\} \leq d \leq 2.3 \times \lambda 1/\{n(\lambda 1)-1\}$, where d is the predefined depth of the step difference, and $n(\lambda 1)$ is a refractive index of a material of the first phase structure for the wavelength $\lambda 1$.

21. The objective optical system of claim 14, wherein the first phase structure is divided in a plurality of ring-shaped zones on the optical surface comprising the first phase structure, every adjoining ring-shaped zones are divided through a step difference with a predefined depth parallel to an optical axis, and when the wavelengths $\lambda 1$, $\lambda 2$ and $\lambda 3$ satisfy the following expressions:

390 nm<$\lambda 1$<420 nm, 640 nm<$\lambda 2$<680 nm, and 760 nm<$\lambda 3$<805 nm, the objective optical system satisfies $9.7 \times \lambda 1/\{n(\lambda 1)-1\} \leq d \leq 10.3 \times \lambda 1/\{n(\lambda 1)-1\}$, where d is the predefined depth of the step difference, and $n(\lambda 1)$ is a refractive index of a material of the first phase structure for the wavelength $\lambda 1$.

22. The objective optical system of claim 1, wherein when the first light flux with the wavelength $\lambda 1$ enters into the first lens provided individually with a magnification m1=0 and a transmitted light flux in the first lens is measured, the first lens causes a wavefront aberration of 0.070 $\lambda 1$ rms or less, and when the first light flux with the wavelength $\lambda 1$ enters into the second lens provided individually with a magnification m2=P1/P and a transmitted light flux in the second lens is measured, the second lens causes a wavefront aberration of 0.070 $\lambda 1$ rms or less, where P1 is a refractive power of the first lens, and P is a composite power of the first lens and the second lens.

23. The objective optical system of claim 1, wherein the first lens is a biconvex lens.

24. The objective optical system of claim 1, wherein the second lens comprises a material such that a hindered amine light stabilizer and a heat stabilizer are added into a cyclic olefin copolymer represented by a general chemical formula (I), where $R^1$ is a one or more bivalent group selected from a hydrocarbon group with 2-20 carbon atoms, $R^2$ is a one or more monovalent group selected from a group consisting of a hydrogen and a hydrocarbon group with 1-5 carbon atoms, and each of x and y is copolymer ratio and a real number satisfying that x/y is equal to or more than 5/95 and is equal to or less than 95/5:

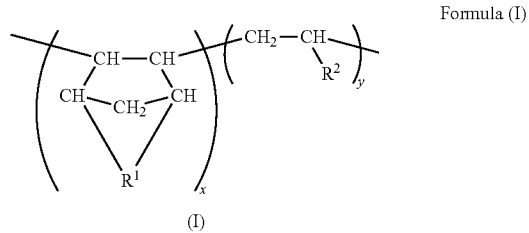

Formula (I)

25. The objective optical system of claim 1, wherein at least one of the first lens and the second lens comprises a material such that microparticles whose diameter is equal to or less than 30 nm are dispersed in a resin provided as a base material.

26. The objective optical system of claim 25, wherein the microparticles are inorganic particles.

27. The objective optical system of claim 25, wherein the microparticles comprise inorganic oxide.

28. The objective optical system of claim 25, wherein the objective optical system satisfies $|A|<8\times10^{-5}$ where |A| is a refractive index change amount of the lens comprising the material such that microparticles whose diameter is equal to or less than 30 nm are dispersed in a resin provided as a base material when a temperature of the lens raises by 1 C.°.

29. An optical pickup apparatus comprising:

a first light source emitting a first light flux with a wavelength $\lambda 1$ for recording or reproducing information on an information recording surface of a first optical information recording medium with a protective layer with a thickness t1; and the objective optical system of claim 1.

30. The optical pickup apparatus of claim 29 further comprising:

a second light source emitting a second light flux with a wavelength $\lambda 2$ ($\lambda 1<\lambda 2$) for recording or reproducing information on an information recording surface of a second optical information recording medium with a protective layer with a thickness t2 ($t1 \leqq t2$).

31. The optical pickup apparatus of claim 30 further comprising:

a third light source emitting a third light flux with a wavelength $\lambda 3$ ($\lambda 2<\lambda 3$) for recording or reproducing information on an information recording surface of a third optical information recording medium with a protective layer with a thickness t3 ($t2<t3$).

* * * * *